Patented Apr. 9, 1946

2,397,928

UNITED STATES PATENT OFFICE 2,397,928

INDIGOID COLORING COMPOUNDS

Joseph B. Dickey and James G. McNally, Rochester, N. Y., assignors to Eastman Kodak Company, Rochester, N. Y., a corporation of New Jersey No Drawing. Application May 9, 1940,
Serial No. 334,236

5 Claims. (Cl. 260—323)

This invention relates to indigoid coloring matters containing an acid ester of an acid of phosphorus group and their application to the coloration of materials. More particularly our invention relates to water-soluble indigo and thioindigo dye compounds containing an acid ester of an acid of phosphorus group and their application for the coloration of textile materials, especially organic derivatives of cellulose by dyeing, printing, stenciling or like methods.

Indigoid coloring matters are characterized by the presence of the chromophore CO.C:C.CO. While our invention relates broadly to dye compounds containing this chromophore grouping, it relates more particularly to the indigo and thioindigo members of the series. Further while our invention relates broadly to an acid ester of an acid of phosphorus grouping it relates more particularly to such a grouping in which the phosphoric or phosphorus group contains a substituent such as an alkyl, a phenyl, a cycloalkyl, a furyl, an aralkyl or an amino group.

It is an object of our invention to provide new indigoid coloring matters. Another object of our invention is to provide water-soluble indigoid coloring matters containing an acid ester of an acid of phosphorus group. A further object is to provide new water-soluble indigo and thioindigo dye compounds containing an acid ester of an acid of phosphorus group. A still further object is to provide colored organic derivative of cellulose textile materials which are of good fastness to light and washing. Other objects will appear hereinafter.

In order that the expression "organic derivatives of cellulose" may be clearly understood, it should be noted that typical organic derivatives of cellulose include the hydrolyzed as well as the unhydrolyzed organic acid esters of cellulose, such as cellulose acetate, cellulose formate, cellulose propionate or cellulose butyrate, and the hydrolyzed as well as the unhydrolyzed mixed organic acid esters of cellulose such as cellulose acetate-propionate, cellulose acetate-butyrate and the cellulose ethers, such as methyl cellulose, ethyl cellulose or benzyl cellulose.

The acid ester of an acid of phosphorus group is joined indirectly to the indigoid coloring matter. Various linkages can be employed to join the acid ester of an acid of phosphorus group to the indigoid nucleus. Normally the acid ester of an acid of phosphorus group is joined through a suitable linkage to a nuclear carbon atom although it can be similarly joined to another atom such as a nuclear nitrogen atom, for example. The acid ester of an acid of phosphorus group, which is more particularly defined hereinafter, is joined through oxygen, carbon, sulfur or nitrogen or a combination of two or more of these elements to the nucleus of the indigoid compound.

Ordinarily the acid ester of an acid of phosphorus grouping which we shall sometimes refer to hereinafter as "the phosphorus grouping" is joined through an —O-aliphatic or a

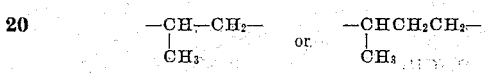

linkage to the indigoid nucleus. The aliphatic linkage may be an unsubstituted hydrocarbon linkage containing at least two carbon atoms such as —CH₂CH₂—, —CH₂CH₂CH₂—,

—CH₂CH₂CH₂CH₂—

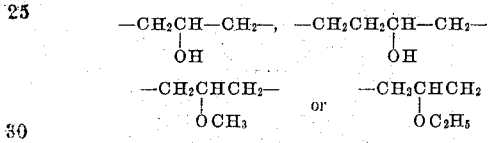

for example, a substituted hydrocarbon linkage such as

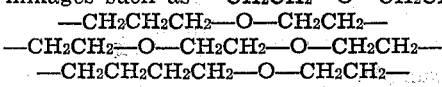

and linkages such as —CH₂CH₂—O—CH₂CH₂—,
—CH₂CH₂CH₂—O—CH₂CH₂—
—CH₂CH₂—O—CH₂CH₂—O—CH₂CH₂—
—CH₂CH₂CH₂CH₂—O—CH₂CH₂— or

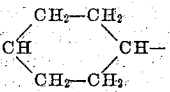

for example. The particular aliphatic linkages given are intended to be illustrative and not limitative of the invention. A

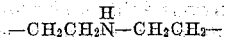

linkage, for example, could also be employed.

The phosphorus grouping can likewise be joined to the nuclear carbon atom through a —S-aliphatic linkage, for example. While the various illustrative aliphatic linkages above given can be employed ordinarily the ethylene linkage is used.

The expression "an acid ester of an acid of phosphorus" includes esters, for example, of phosphoric, phosphorus and thiophosphoric acids, By "a phosphoric acid ester group" we include the phosphoric acid ester group in its free acid,

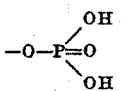

or salt form, such as

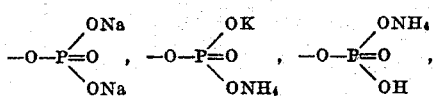

for example, as well as substituted phosphoric acid ester groups such as

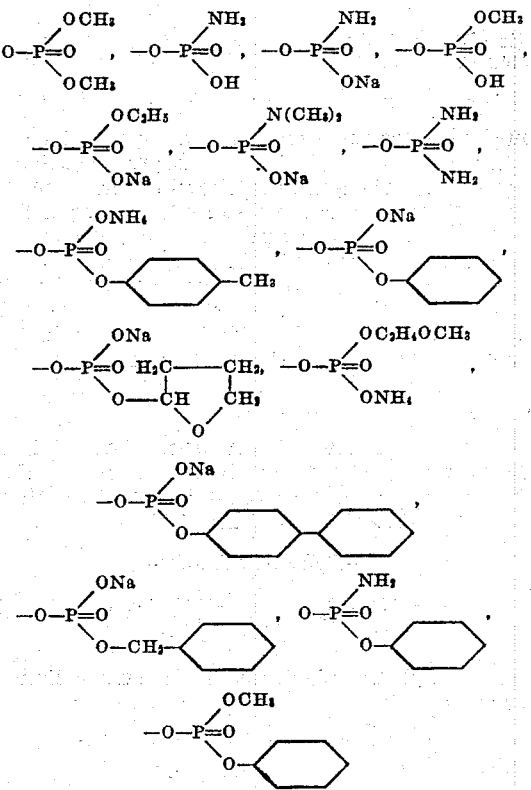

and

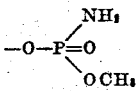

for example.

Similarly, by a "thiophosphoric acid ester group" we include the thiophosphoric acid ester groups corresponding to the phosphoric acid ester groups just given, for example. The formulae for these thiophosphoric acid ester groups can be obtained by replacing the double bonded oxygen atom attached to phosphorus, in the above formulae given for representative phosphoric acid ester groups, with an atom of sulfur.

By a "phosphorous acid ester group" we include those corresponding to the phosphoric ester groups just given, for example. The formulae for these phosphorous acid ester groups can be obtained by omitting the double bonded oxygen atom attached to phosphorus in the above formulae given for representative phosphoric acid ester groups.

The new indigoid coloring compounds of our invention can be prepared by introducing a phosphorus group into an indigoid compound containing an external hydroxyl group capable of being converted to a phosphorus group. The agent used to convert the hydroxyl group into a phosphorus group will be referred to by use as "a phosphating agent." Suitable phosphating agents include, for example, phosphorus oxychloride, $POCl_3$, phosphorus oxybromide, $POBr_3$, phosphoric acid $H_3PO_4$, phosphoric anhydride, $P_2O_5$, phosphorus sulfochloride, $PSCl_3$, phosphorus sulfobromide, $PSBr_3$, phosphorus pentasulfide, $P_2S_5$, phosphorus trichloride, $PCl_3$, and phenoxyphosphorus dichloride,

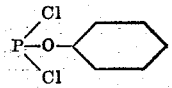

The preparation of numerous phosphating agents which can be employed in the preparation of the new indigoid coloring compounds of our invention is described or indicated following the examples illustrating the preparation of our new indigoid dye compounds.

The new indigoid compounds of our invention, depending on their particular structure, possess affinity for organic derivatives of cellulose, wool, silk, cotton, viscose, linen, nylon and casein wool. Whether a dye possesses sufficient affinity for one or more of these materials to make it of practical value can be readily determined by a few simple dyeing tests. The compounds possess rather general affinity for organic derivatives of cellulose, especially cellulose acetate silk, but this affinity varies considerably. Compounds wherein the phosphorus group is unsubstituted appear to have less affinity for cellulose acetate silk, for example, than those in which the phosphorus group is substituted. For the dyeing of organic derivatives of cellulose the dyes should contain no free sulfonic acid group attached directly to its nucleus.

The dye compounds of our invention possess a wide range of solubility in water, varying from those practically insoluble or relatively insoluble to those having a relatively high solubility in water. Many of the compounds are sufficiently water-soluble that they can be applied directly from an aqueous solution to the material being dyed or colored without the use of a dispersing or solubilizing agent. It should be noted, however, that those compounds having a relatively high water solubility have less affinity for organic derivatives of cellulose than those not having such a relatively high water solubility.

The water solubility of the indigoid dye compounds of our invention is dependent on a variety of factors. The presence of certain salt forming atoms or radicals such as Na, K or $NH_4$ increases the solubility of the compounds in water. To illustrate, compounds wherein one or more of the hydrogen atoms of the phosphorus group are replaced by an alkali metal such as sodium or potassium or the ammonium radical are more water-soluble than the corresponding compounds wherein the hydrogen atoms are not replaced or are replaced, for example, with an alkyl or an aryl radical. Similarly where the phosphorus group is joined to an unsubstituted hydrocarbon linkage, the solubility generally decreases with increase in the number of carbon atoms in the linkage. It will be understood that the remarks made with respect to water solubility are merely illustrative and are not intended to be exhaustive. From the foregoing, however, the manner of varying the solubility of the compounds should be readily apparent.

Generally speaking, compounds wherein at least one of the hydrogen atoms of the phosphorus group is substituted with a substituent, other than a salt forming group or radical, are better adapted for the dyeing or coloring of organic derivatives of cellulose, such as cellulose acetate, than those in which the hydrogens are not substituted or are replaced by a salt forming group or radical.

As previously noted, any of the indigoid coloring matters, constituting a well known class of dyes, which contain a hydroxyl group, joined through a suitable linkage to the nucleus, capable of being converted into a phosphorus compound can be employed in the preparation of the dye compounds of our invention. Our invention, however, relates more particularly to the indigo and thioindigo members of the indigoid series. Our invention will be clear from the following examples which illustrate the preparation of the dye compounds of our invention.

*Example 1*

43.9 grams of

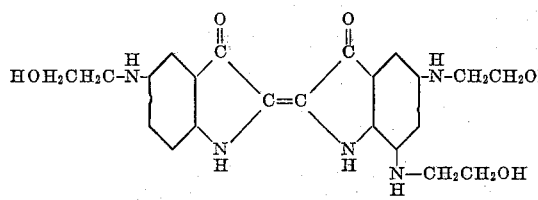

are placed in pyridine and treated in the cold with 44.7 grams of methoxy phosphorous oxydichloride,

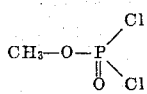

The reaction which takes place is completed by warming following which the reaction mixture obtained is treated with a sodium carbonate solution to obtain the mono sodium salt form of the dye. In the reaction which has taken place, the β-hydroxyethylamino groups attached to the indigo compound are converted to a

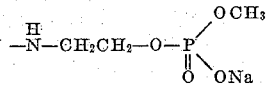

group. If other salts of the compound obtained are desired, the compound is treated with a mineral acid and then with the desired base as, for example, ammonia, calcium hydroxide or diethanolamine following which the dye compound formed is recovered by salting, filtered and dried. The dye compounds obtained in accordance with the example color cellulose acetate silk blue from an aqueous solution.

It will be understood that the β-hydroxyethylamino groups of the indigo starting compound can be replaced, for example, by a β-hydroxypropylamino, a

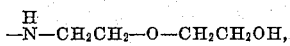

a

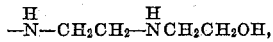

a —SCH₂CH₂OH or a γ-hydroxypropylamino group to obtain dye compounds in which the hydroxyl groups are replaced by the phosphoric groupings shown in the example.

*Example 2*

33.2 grams of

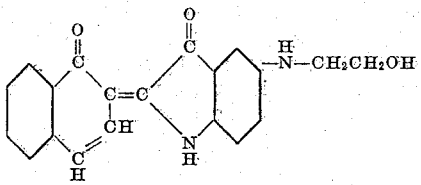

are treated in pyridine with 15.34 grams of phosphorus oxychloride and the reaction taking place in completed by warming. Ammonia gas is then passed into the reaction mixture and the dye formed is recovered by pouring into water and filtering. In the reactions which take place the β-hydroxyethylamino group is converted to a

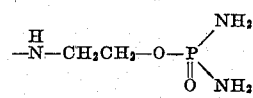

group. The dye compound obtained in accordance with the example colors cellulose acetate silk blue.

*Example 3*

40.2 grams of

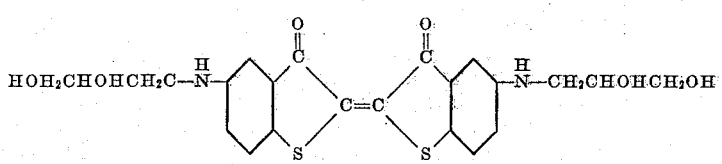

are dissolved in pyridine and treated in the cold with 30.7 grams of phosphorus oxychloride and the reaction which takes place is completed by warming. The chloride of the dye compound formed is then hydrolyzed by treatment with aqueous sodium carbonate following which the reaction mixture is neutralized with a mineral acid and then treated with ammonium hydroxide to form the ammonium salt form of the dye. The dye compound can be recovered by filtering the reaction mixture, precipitating the dye from the filtrate by adding sodium chloride and recovering the dye by filtering and then drying. In the above reaction the glyceryl amino groups are converted to

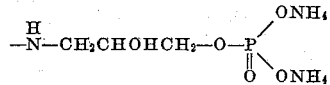

groups. The dye compound obtained colors cellulose acetate silk bluish gray.

*Example 4*

33.5 grams of

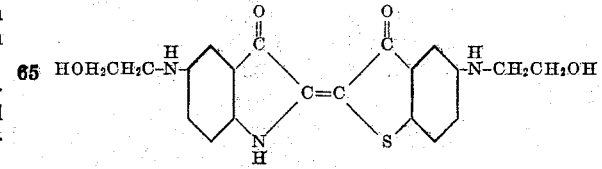

are dissolved in pyridine and treated with 38.6 grams of

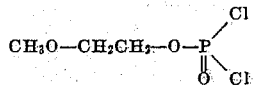

in the cold and the reaction is completed by warming. The chloride of the dye formed is hydrolyzed by treatment with aqueous sodium carbonate following which the reaction mixture is neutralized with a mineral acid. Following the treatment described the reaction mixture is then treated with ethanolamine, filtered, and the dye compound precipitated from the filtrate by the addition of sodium chloride. The dye compound formed is then recovered by filtration and dried. In the reaction which takes place the β-hydroxyethylamino groups are converted to $$-\underset{H}{N}-CH_2CH_2-O-\underset{\underset{O}{\parallel}}{P}\begin{smallmatrix}OH.NH_2CH_2CH_2OH\\OCH_2CH_2OCH_3\end{smallmatrix}$$

groups. The dye compound of this example colors cellulose acetate silk violet.

Example 5

26.7 grams of

[structure: H₂N-substituted indigo-type dye with S]

are treated with an excess of ethylene chlorohydrin in known fashion to convert the amino group into a mixed mono- and di-β-hydroxyethylamino group. The reaction mixture resulting is treated in pyridine with about 15.4 grams of phosphorus oxychloride in the manner described in the previous examples. The β-hydroxyethylamino group is probably converted to a $$-\underset{H}{N}-CH_2CH_2-O-\underset{\underset{O}{\parallel}}{P}\begin{smallmatrix}ONH_4\\ONH_4\end{smallmatrix}$$

group. The dye compound of this example colors cellulose acetate silk red.

Example 6

35 grams of

[structure: indigo dye with CH₂CH₂OH groups on both N atoms]

are treated in the cold with 34 grams of phosphorus oxychloride, the reaction and recovery of the dye compound being carried out as described in the previous examples. In the reaction taking place the β-hydroxyethyl groups are converted to $$-CH_2CH_2-O-\underset{\underset{O}{\parallel}}{P}\begin{smallmatrix}ONa\\ONa\end{smallmatrix}$$

groups. The dye compound obtained colors cellulose acetate silk blue.

By the substitution of an equivalent gram molecular weight of methoxy phosphorus oxy-dichloride or an equivalent gram molecular weight of benzyloxy phosphorus oxy-dichloride for the phosphorus oxychloride of the example dye compounds, in which the β-hydroxethyl groups are converted to $$-CH_2CH_2-O-\underset{\underset{O}{\parallel}}{P}\begin{smallmatrix}OCH_3\\ONa\end{smallmatrix}$$

and $$-CH_2CH_2-O-\underset{\underset{O}{\parallel}}{P}\begin{smallmatrix}OCH_2-C_6H_{11}\\ONa\end{smallmatrix}$$

groups, can be obtained.

Example 7

33.2 grams of

[structure: indigo dye with HOH₂CH₂C-O- substituents on both sides]

are treated in pyridine with 32.4 grams of $$\underset{Cl}{\overset{Cl}{\phantom{|}}}\underset{\underset{O}{\parallel}}{P}-N\begin{smallmatrix}CH_3\\CH_3\end{smallmatrix}$$

The reaction and recovery of the dye compound can be carried out in accordance with the procedure described in the foregoing examples. In the reaction which takes place the β-hydroxyethoxy groups are converted to $$-O-CH_2CH_2-O-\underset{\underset{O}{\parallel}}{P}\begin{smallmatrix}N(CH_3)_2\\OH.NH(CH_3)_2\end{smallmatrix}$$

groups. The dye compound obtained colors cellulose acetate silk blue.

Example 8

.1 gram molecular weight of $$[HO_n(H_2CO)H_2CH_2C]_2N-\text{[indigo core]}-N[CH_2CH_2(OCH_2CH_2)_nOH]_2$$

wherein $n$ represents 1, 2 or 3, for example, is heated in dimethylaminocyclohexane with .2 gram mol of (phenoxy-, methoxy-, o-tetrahydrofuryl-, benzyl-oxy or cyclohexyl-oxy) phosphorus oxy-dichloride, the reaction being carried out in accordance with the procedure previously described. In the reaction which takes place the aliphatic groups attached to the indigo dye are converted to $$-CH_2CH_2(OCH_2CH_2)_n-O-\underset{\underset{O}{\parallel}}{P}\begin{smallmatrix}O-R\\ONa\end{smallmatrix}$$

groups wherein R represents phenyl, methyl tetrahydrofuryl, benzyl or cyclohexyl.

Example 9

43.9 grams of

[structure: indigo dye with HOH₂CH₂C-N(H)- on one side and -N(H)-CH₂CH₂OH and N-CH₂CH₂OH on the other]

is dissolved in pyridine and treated with 45.4 grams of phosphorus trichloride in the cold. The reaction mixture is then slowly warmed to 60–70° C. and held at that temperature for one hour after which it is permitted to cool. The sodium salt of the dye formed is obtained by adding sodium hydroxide until the reaction mixture is slightly alkaline to litmus. The pyridine is removed from the reaction mixture by distillation following which the reaction product is dissolved in water, filtered and the desired dye compound obtained by precipitation with sodium chloride and filtration. In the reaction which takes place the β-hydroxyethylamino groups are converted to

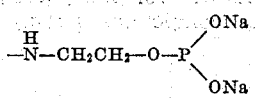

groups. The dye compound obtained colors silk, wool, nylon and casein wool blue.

*Example 10*

385.2 grams of

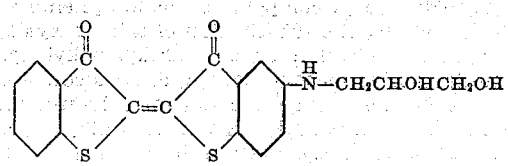

is dissolved in pyridine and reacted with 232.1 grams of phenoxy phosphorus oxy-dichloride. The reaction and recovery of the dye compound formed can be carried out as described in Example 9. In the reaction which takes place the glycerylamino group is believed to be converted to a

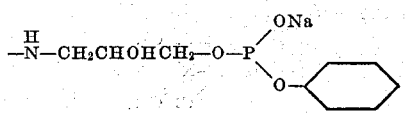

group. The dye compound obtained colors cellulose acetate silk, wool, nylon and silk blue.

*Example 11*

401.2 grams of

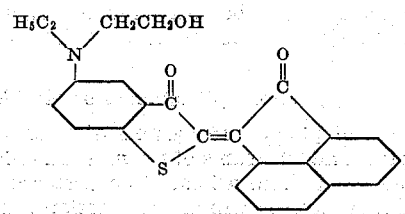

is dissolved in pyridine and treated with 170.6 grams of

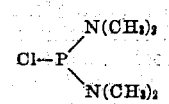

in accordance with the procedure described in Example 9. In the reaction which takes place the β-hydroxyethyl group is converted to a

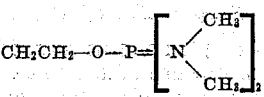

group. The dye compound obtained colors cellulose acetate silk red.

*Example 12*

33.8 grams of

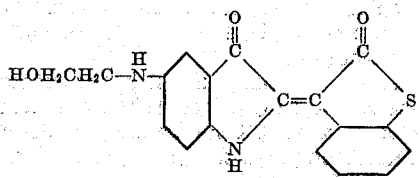

is reacted in pyridine with 20.5 grams of o-tetrahydrofuryl phosphorus oxy-dichloride. The reaction and recovery of the dye compound formed is carried out as described in Examples 1 to 10. In the reaction which takes place the β-hydroxyethylamino group is converted to a

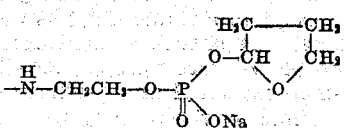

group, this group being shown in its sodium salt form. The dye compound obtained yields violet colorations.

*Example 13*

33.4 grams of

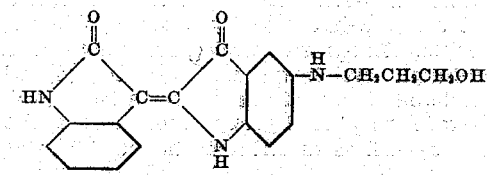

is reacted with 14.5 grams of dimethoxy phosphorus oxy-monochloride, the reaction and recovery of the dye compound formed being carried out as described in Examples 1 to 10. In the reaction which takes place the γ-hydroxypropyl group is converted to a

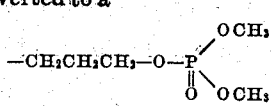

group. The dye compound obtained yields violet colorations.

*Example 14*

38.2 grams of

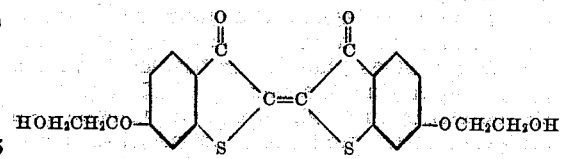

is treated in pyridine with .1 gram mole of methoxy phosphorus oxy-dichloride, the reaction and recovery of the dye compound formed being carried out as described in Examples 1 to 10. In the reaction which takes place the β-hydroxyethoxy groups are converted to

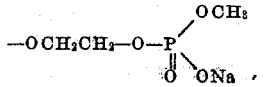

groups. The dye compound obtained yields red colorations.

It will be understood that in all of the examples wherein a phosphoric acid ester compound is formed, the corresponding thiophosphoric acid ester compounds can be prepared by using an equivalent amount of the thiophosphoric phosphating agent corresponding to the phosphoric phosphating agent employed. Similarly, in those examples where a phosphorus phosphating agent is employed a thiophosphoric or phosphoric phosphating agent corresponding thereto can be employed to obtain dye compounds of our invention.

In certain of the examples the phosphorus group is shown in a salt form the preparation of which is not described. From the description which has been given the preparation of the particular salt form shown or other salt forms will be apparent. The free acid form of the compounds of our invention can be prepared by treating the salt forms with a mineral acid such as hydrochloric acid.

It is to be understood that the term "an alkyl group" includes unsubstituted alkyl groups such as methyl, ethyl, propyl and butyl as well as substituted alkyl groups such as β-hydroxyethyl, β-hydroxypropyl, γ-hydroxypropyl, β,γ-dihydroxypropyl, β-methoxy ethyl and β-ethoxy ethyl, for example. Similarly the term "an amino group" includes the amino group as well as substituted amino groups such as methylamino, ethylamino, propylamino, β-hydroxyethylamino, glycerylamino and β-methoxy ethylamino, for example. Likewise furyl includes the furyl group, tetrahydrofuryl, 5-ethyl furyl, 5-methyl tetrahydrofuryl and 5-β-hydroxyethyl tetrahydrofuryl, for example. Illustrative cycloalkyl groups include cyclobutyl, cyclohexyl and cycloheptyl, while benzyl and phenyl ethyl are illustrative of aralkyl. The term "a phenyl group" includes the phenyl group as well as substituted phenyl. The phenyl nucleus can be substituted, for example, with a hydroxy group, an alkyl group, an alkoxy group or a halogen atom.

Numerous phosphating agents can be employed in the preparation of the compounds of our invention. The preparation of a large number of phosphating agents which we can employ is given hereinafter.

Phosphating agents having the formula:

wherein A and B each represents a halogen atom and X represents an amino, an O-alkyl, an O-aryl, an O-cycloalkyl, an O-aralkyl or an O-furyl group can be prepared by reacting a phosphorus trihalide such as phosphorus trichloride with a compound having the formula: R₁OH, wherein R₁ represents an alkyl, an aryl, a cycloalkyl, an aralkyl or a furyl group. Compounds of the above formula wherein X represents an amino group can be prepared by reacting a phosphorus trihalide with ammonia.

Phosphating compounds having the general formula

wherein Y represents hydrogen or an alkyl group may be prepared by reacting in equal molar proportions, phosphorus oxychloride with a compound having the general formula

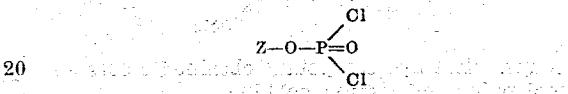

wherein Y represents hydrogen or an alkyl group. Phosphorus oxychloride can be reacted, for example, with ammonia, methylamine, ethylamine, dimethylamine and ethanolamine to obtain

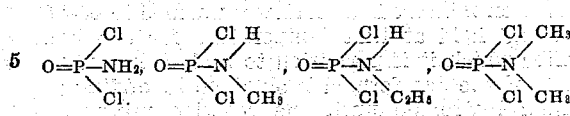

and

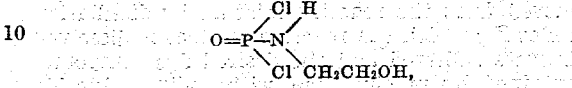

respectively. The corresponding thiophosphoric compounds can be obtained by substituting phosphorus sulfochloride for phosphorus oxychloride.

Phosphating compounds having the general formula $$Z-O-P\diagdown\begin{matrix}Cl\\ \diagup\\ =O\\ \diagdown Cl\end{matrix}$$

wherein Z is an aryl nucleus, can be prepared by reacting phosphorus oxychloride with a hydroxyaryl compound in equal molar proportions. Suitable hydroxyaryl compounds include phenol and naphthol. By the substitution of a hydroxyalkyl, a hydroxycycloalkyl or a hydroxyaralkyl compound such as methyl alcohol, ethyl alcohol, cyclohexanol and benzyl alcohol for a hydroxyaryl compound, compounds wherein Z is alkyl, cycloalkyl or aralkyl can likewise be prepared. Further, by the substitution of phosphorus sulfochloride for phosphorus oxychloride, the corresponding thiophosphoric compounds can be prepared.

The general method of preparing the phosphating agents will be further clarified by the following examples:

*Preparation of*

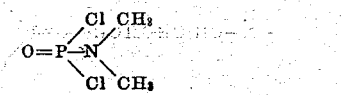

16 grams of phosphorus oxychloride are dissolved in 100 grams of dry pyridine and the resulting solution is cooled to 0° C. 45 grams of dimethylamine dissolved in 50 cc. of cold dry pyridine are then added with stirring and stirring is continued until reaction is complete. The desired compound may be recovered by fractional distillation of the reaction mixture under reduced pressure.

*Preparation of phenoxy phosphorus oxydichloride*

47 grams of phenol, 154 grams of phosphorus oxychloride, and 7.5 grams of magnesium chloride are mixed together and heated on a steam bath for 8 hours, following which the reaction mixture is heated to 110–120° C. for 2½ hours. The reaction mixture is then fractionated under reduced pressure to give a good yield of phenoxy phosphorus oxydichloride boiling at 95–105°/3 mm. Phosphorus sulfochloride can be substituted for phosphorus oxychloride in the above reaction to prepare phenoxy phosphorus sulfodichloride. Other hydroxy aromatic compounds can be substituted for phenol in the above reaction to obtain various aromatic oxy phosphorus chlorides.

*Preparation of amyloxy*

85 grams of phosphorus sulfodichloride in 50 cc. of chloroform are added to 44 grams of amyl alcohol in 150 cc. of chloroform and the reaction mixture is heated on a steam bath for 12 hours. The chloroform may be removed by distillation under reduced pressure to obtain amyloxy phosphorus sulfodichloride. By the use of 88 grams of amyl alcohol, diamyloxy phosphorus sulfomonochloride can be obtained. Similarly, by the use of phosphorus oxychloride the corresponding phosphorus oxychlorides can be prepared. Again, by the use of an alcohol other than amyl, other phosphorus sulfochloride compounds can be prepared. To illustrate, it ethyl alcohol is used, ethoxy phosphorus sulfodichloride and diethoxy phosphorus sulfomonochloride can be prepared.

*Preparation of ethylamino phosphorus oxydichloride*

53 grams of ethylamine hydrochloride is heated with 200 grams of phosphorus oxychloride and the mixture is refluxed for four hours. Any excess phosphorus oxychloride may be removed by distillation. The product obtained has the formula:

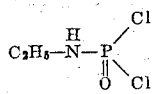

In place of ethylamine, any primary or secondary alkylamine may be used and in place of phoshorus oxychloride, phosphorus sulfochloride may be used. If n-propylamine hydrochloride is substituted for ethylamine hydrochloride above, for example, n-propylaminophosphorus oxydichloride can be obtained. Similarly, if $PSCl_3$ is substituted for phosphorus oxychloride, ethylaminophosphorus sulfodichloride will be obtained.

The indigoid dye compounds of our invention are, for the most part, soluble in water and may be applied to material undergoing dyeing from an aqueous solution of the dye. Those compounds which are relatively insoluble or sufficiently insoluble in water as to render the use of a dispersing or solubilizing agent advantageous may be employed for the direct dyeing of the materials named herein by grinding the dye to a fine powder, intimately mixing it with a suitable dispersing or solubilizing agent and adding the resulting mixture to water or a dilute solution of soap in water to form an aqueous dyebath. Following this known preparation of the dyebath, the material or materials to be dyed (ordinarily textile materials) may be added to the dyebath and the dyeing operation conducted in known fashion. If desired, common salt may be added to promote exhaustion of the dyebath.

Dyeing operations can be conducted advantageously at a temperature of 80–85° C. but any suitable temperature may be employed. In accordance with the usual dyeing practice, the material or materials to be dyed will ordinarily be added to the dyebath at a temperature lower than that at which the main portion of the dyeing is to be effected. A temperature approximating 45–55° C., for example, following which the temperature of the dyebath is raised to that selected for carrying out the dyeing operation. The temperature at which the dyeing is conducted will vary somewhat depending upon the particular material or materials undergoing coloration. Dispersing or solubilizing agents that can be employed for preparing suspensions of the relatively insoluble dye compound include soap, sulforicinoleic acid, a salt of sulforicinoleic acid and sulfonated oleic, stearic, or palmitic acid or salts thereof such, for instance, as the sodium or ammonium salts.

The following example illustrates how dyeing may be carried out in accordance with our invention. Quantities are expressed in parts by weight.

*Example A*

2.5 parts of the dye compound of Example 1 are added to 834 parts of water heated to 45–55° C. and 100 parts of cellulose acetate in the form of threads or fibers or fabric, for example, are entered and the temperature raised to 80–85° C. The cellulose acetate is worked at this temperature until dyeing is complete. The cellulose acetate is dyed a blue shade of good light fastness.

Where an insoluble or relatively insoluble dye compound of our invention is employed as the dye, it will, as previously noted, be first subjected to a dispersing or solubilizing treatment following which the dyeing operation may be carried out in accordance with the general method described above.

While our invention has been illustrated in connection with the dyeing of cellulose acetate silk, it will be understood that dyeing operations can be carried out in a manner similar to that described above by the substitution of another organic derivative of cellulose material or another of the materials named herein for the cellulose acetate silk or by employing a dye compound other than that employed in the example or by substitution of both the material being dyed and the dye compound of the example.

We claim:

1. The indigo compound having in its sodium salt form the formula:

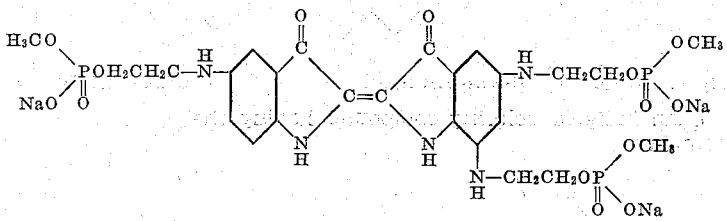

2. An indigoid coloring compound having the formula:

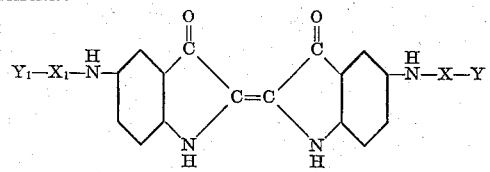

wherein X and $X_1$ each represents a low carbon aliphatic group, Y and $Y_1$ each represents a member selected from the group consisting of a

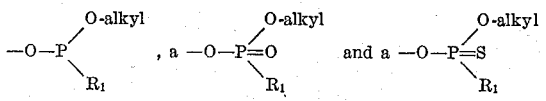

group wherein $R_1$ represents a member selected from the group consisting of a $-OR_3$ and a

group wherein $R_3$ represents a member selected from the group consisting of hydrogen, a salt forming group, an alkyl group, an aryl group, a furyl group, a cycloalkyl group and an aralkyl group and $R_4$ and $R_5$ each represents a member selected from the group consisting of hydrogen and an alkyl group and wherein $Y_1$ may be in addition hydrogen.

3. An indigoid coloring compound having the formula:

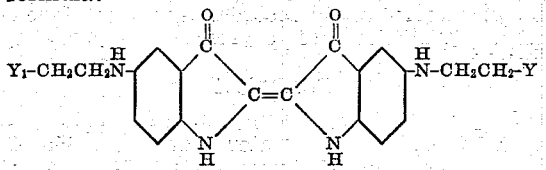

wherein Y and $Y_1$ each represents a member selected from the group consisting of a

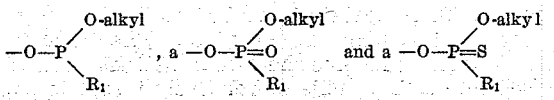

group wherein $R_1$ represents a member selected from the group consisting of a —$OR_3$ and a

group wherein $R_3$ represents a member selected from the group consisting of hydrogen, a salt forming group, an alkyl group, an aryl group, a furyl group, a cycloalkyl group and an aralkyl group and $R_4$ and $R_5$ each represents a member selected from the group consisting of hydrogen and an alkyl group and wherein $Y_1$ may be in addition hydrogen.

4. The indigoid compound having the formula:

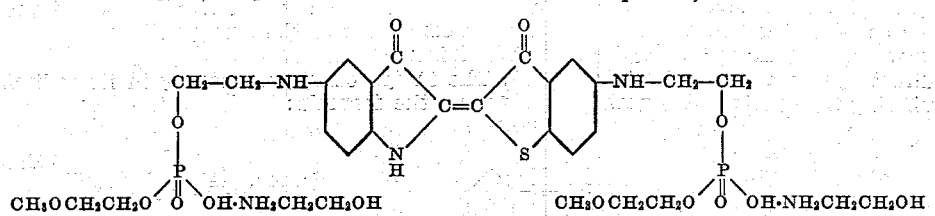

5. An indigoid coloring compound having the formula:

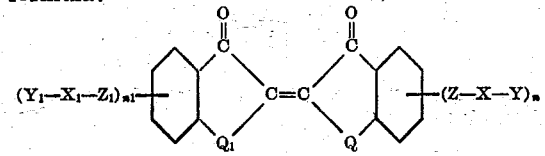

wherein X and $X_1$ each represents a low carbon aliphatic group, Z and $Z_1$ each represents a member selected from the group consisting of an —NH-group, and —O— atom and an —S— atom, Q and $Q_1$ each represents a member selected from the group consisting of an —NH-group and an —S— atom, Y and $Y_1$ each represents a member selected from the group consisting of a

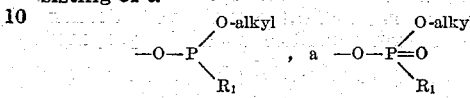

and a

group, wherein $R_1$ represents a member selected from the group consisting of —$OR_3$ and a

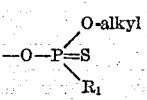

group wherein $R_3$ represents a member selected from the group consisting of hydrogen, a salt forming group, an alkyl group, an aryl group, a furyl group, a cycloalkyl group and an aralkyl group, $R_4$ and $R_5$ each represents a member selected from the group consisting of hydrogen and an alkyl group and wherein $Y_1$ may be in addition hydrogen, $n$ represents a member selected from the group consisting of 1 and 2 and $n_1$ represents a member selected from the group consisting of 0 and 1 provided that when $n+n_1$ equals 2, $n_1$ is 1.

JOSEPH B. DICKEY.
JAMES G. McNALLY.